United States Patent [19]

Bush

[11] 4,372,832
[45] Feb. 8, 1983

[54] POLLUTION CONTROL BY SPRAY DRYER AND ELECTRON BEAM TREATMENT

[75] Inventor: John R. Bush, Naperville, Ill.

[73] Assignee: Research-Cottrell, Incorporated, Bridgewater Township, Somerset County, N.J.

[21] Appl. No.: 226,853

[22] Filed: Jan. 21, 1981

[51] Int. Cl.³ .............................................. B01J 19/08
[52] U.S. Cl. ............................ 204/157.1 R; 422/186; 204/157.1 H
[58] Field of Search ................. 204/157.1 P, 157.1 H; 250/527; 422/186

[56] References Cited

U.S. PATENT DOCUMENTS

| | | |
|---|---|---|
| 3,389,971 | 6/1968 | Alliger . |
| 3,565,777 | 2/1971 | Lauer . |
| 3,653,185 | 4/1972 | Scott et al. |
| 3,869,362 | 3/1975 | Machi et al. |
| 3,981,815 | 9/1976 | Taniguchi et al. |
| 3,984,296 | 10/1976 | Richards ...................... 204/157.1 P |
| 3,997,415 | 12/1976 | Machi et al. |
| 4,004,995 | 1/1977 | Machi et al. |
| 4,097,349 | 1/1978 | Zenty ............................ 204/157.1 P |
| 4,294,674 | 10/1981 | Aoki et al. ................... 204/157.1 H |

Primary Examiner—Howard S. Williams
Attorney, Agent, or Firm—Kerkam, Stowell, Kondracki & Clarke

[57] ABSTRACT

A combination spray drying and electron beam treatment for effluent gases provides air pollution control for even high sulfur coals.

Liquid and a reagent are injected into the effluent gas in the spray dryer, thereby cleansing the effluent gas, decreasing its temperature, and increasing its moisture content. The spray drying decreases the temperature at least to below 100° C. and, most preferably, to between 60° C. and 70° C. The decreased temperature, increased moisture content effluent gas including both reacted compounds and unreacted reagent is conveyed into an irradiation chamber, whereat radiation causes the gaseous sulfur oxides and/or nitrogen oxides to convert into mist and/or solid particles. The unreacted reagent may then react with the acid mist. The effluent gases are then subjected to dry particular collection.

11 Claims, 3 Drawing Figures

POLLUTION CONTROL BY SPRAY DRYER AND ELECTRON BEAM TREATMENT

BACKGROUND OF THE INVENTION

1. Field of the Invention

The present invention relates to an improved process for removing pollutants, especially sulfur dioxide and nitrogen oxides, from effluent gases resulting from the combustion of carbonaceous fuels. Specifically, the invention relates to a synergistic combination of two processes which provide for the removal of sulfur dioxide from high sulfur content coals (over 2% sulfur).

2. Description of the Prior Art

In modern industrial society an extensive amount of effluent gas is generated from automobiles and industrial plants. The adverse impact on human health of certain of the pollutants has only relatively recently begun to be appreciated. Specifically, sulfur dioxide ($SO_2$) and nitrogen oxides of various forms ($NO_x$) are believed to be especially objectionable. Although particulates such as ash and dust are also deleterious to the human body, these solid pollutants are usually easier to remove than the sulfur dioxide and nitrogen oxides.

The pollution problem of recent years has been exacerbated by the energy crisis which has effected most industrial societies including the United States. Specifically, increasing our energy output has become an important national priority. Accordingly, great pressure has developed to use the high sulfur coal which the United States has in relative abundance, and thereby lessen our dependence on expensive imported oil. However, use of the high sulfur content coal causes an increase in the air pollution levels and, specifically, the amount of sulfur dioxide in the air. This poses a dilemma of choosing between using high sulfur coal along with the resulting adverse health effects of high sulfur dioxide pollution or exacerbating the energy shortage by not using the high sulfur coal.

In order to avoid the dilemma posed by the above choice between energy or clean air, numerous methods and apparatuses have been developed to minimize the sulfur dioxide pollution caused by the burning of high sulfur coal. Typically, these prior methods and apparatuses are costly and have large operating and maintenance problems. Often these techniques are constrained by various considerations which render them useful only in very limited conditions.

The prior art has included various wet scrubbing or washing processes. These processes use an aqueous alkali solution which is sprayed into the effluent gas as it passes through a chamber or tower. Relatively large quantities of water are used in the injected slurry in order to saturate the effluent gases. In addition to the disadvantage of requiring large quantities of water, the wet scrubbing processes generate a large amount of waste product solutions which are hard to dispose of without causing water pollution. Further, scaling or solidification of the reaction products occurs on various parts of the wet scrubbing system causing high maintenance costs.

In contrast to the wet scrubbing or washing processes, the prior art has also included a number of so called dry scrubbing processes of which the spray drying process is one type. The spray drying process, illustrated in FIG. 1, is superficially similar to the washing or wet scrubbing process in that water is used to inject an alkali reagent such as lime or such as lime or lime stone into the stream of affluent gases. However, unlike the washing or wet scrubbing process, the spray drying process uses a relatively small quantity of water which will evaporate after it has carried the reagent into a chamber through which the effluent gases pass. From the chamber, the effluent gases pass into a particulate collection means such as a fabric filter or electrostatic precipitator, whereat the solid products of the reaction between the reagent and the pollutant (sulfur dioxide) may be removed. As shown in the FIG. 1 block diagram of this prior art process, the purified effluent gases pass from the particulate collection means into the stack where they are discharged.

Although the spray drying process has been useful in removing pollutants without being subject to the disadvantages of the wet scrubbing or washing processes, the spray drying process has other disadvantages. Specifically, the spray drying process generally requires a higher stoichiometric ratio of reagent (usually calcium from lime or limestone) to sulfur oxides then is the case for the wet scrubbing processes. Typically, in order to achieve 90% removal for affluent gases from high sulfur content coal the stoichiometric ratio of reagent (calcium) content to sulfur oxides must be over 2:1. However, the solids content of the injected slurry in a spray drying process is limited to less than 30%, preferably under 25% to avoid damaging the pump which is used to inject the slurry into the spray dryer. Accordingly, one cannot raise the stoichiometric ratio of reagent to sulfur oxides unless the water content is increased. Yet the water content must be limited in order to keep the process dry and avoid the disadvantages of the washing processes discussed above. As a result of these conflicting considerations and as shown in curve A of FIG. 2, the spray drying process is generally limited to coals having less than 2% sulfur content. Curve A of FIG. 2 shows the relationship of solids content of the slurry to the sulfur content level in the coal as required to meet recent source performance standards for sulfur oxides removal set by the U.S. Environmental Protection Agency. It will thus be appreciated that the spray drying process is useful, but is somewhat limited in applicability because of the necessary design tradeoffs.

A third type of prior art pollution control system is that of ionizing radiation. Such systems use electron beam or ultraviolet light (gamma radiation and other types may as well used) to ionize the nitrogen oxides and sulfur dioxide in the affluent gases. Although the reaction mechanism for the oxidation of sulfur dioxide and nitrogen oxides using this technique is very complex and not fully understood, the ionization caused by the electron beam irradiation converts the sulfur dioxide and nitrogen oxides to acid mist at low temperatures and/or solid particles at high temperatures. An adaption of this process uses a preliminary desulfurizing method such as washing the effluent gases in a tower before radiating the gases.

Unfortunately, the electron beam method usually requires high dosages (two to eight megarads) to satisfactorily remove the pollutants. Additionally, the acid mist has the tendency to corrode the electron beam reaction chamber. An additional disadvantage is that the acid mist and/or solid particles from the electron beam reaction chamber require further processing before they can be disposed of.

SUMMARY OF THE INVENTION

An object of the present invention is to make the spray drying process applicable to high sulfur content coals.

A further object of the present invention is to combine the spray drying process with the electron beam process such that a relatively low stoichiometric ratio of reagent to sulfur dioxide may be utilized.

Yet another object of the present invention is to provide an air pollution control system which does not require large quantities of water or an excessive amount of energy.

A still further object of the present invention is to combine the spray drying process with the electron beam process such that the reaction products out of the electron beam chamber need no further processing for disposal.

Yet another object of the present invention is to provide an air pollution control system having a spray dryer followed by an electron beam radiation chamber such that the spray dryer conditions the effluent gases for more efficient treatment by the electron beam device.

The above and other objects of the present invention are accomplished by delivering effluent gases into a spray dryer and injecting liquid and a reagent into the effluent gas in the spray dryer, thereby cleansing the effluent gas, decreasing its temperature, and increasing its moisture content. The spray drying decreases the temperature at least to below 100° C. and, most preferably, to between 60° C. and 70° C. The decreased temperature, increased moisture content effluent gas including both reacted compounds and unreacted reagent is conveyed into an irradiation chamber, whereat radiation causes the gaseous sulfur oxides and/or nitrogen oxides to convert into mist and/or solid particles. The unreacted reagent may then react with the acid mist. The effluent gases are then subjected to dry particulate collection.

BRIEF DESCRIPTION OF THE DRAWINGS

These and other features of the present invention and the attendant advantages will be readily apparent to those having ordinary skill in the art and the invention will be more easily understood from the following detailed description of the preferred methods and embodiments of the present invention taken in conjunction with the accompanying drawings wherein.

DESCRIPTION OF THE PREFERRED METHOD AND EMBODIMENT

Figure 3:
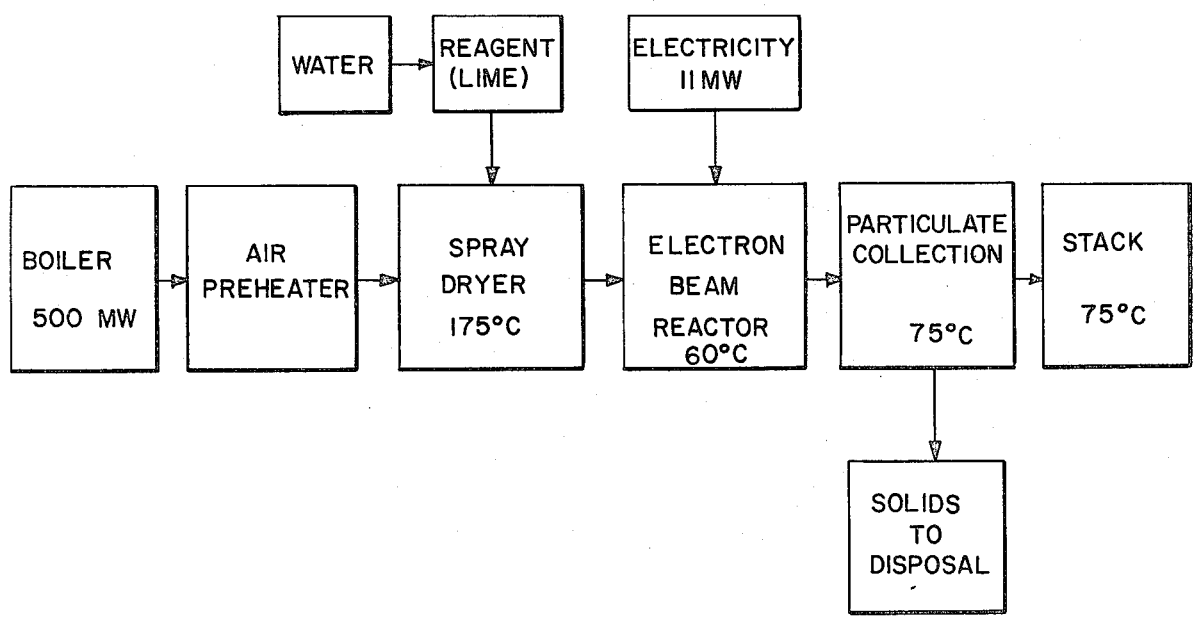
FIG. 3 is a block diagram showing the present invention.

FIG. 3 is a block diagram representing the preferred embodiment and method of the present invention. The meaning of each block will be readily apparent to one of ordinary skill in the art, thereby allowing such an artisan to fully practice the present invention.

Figure 1:
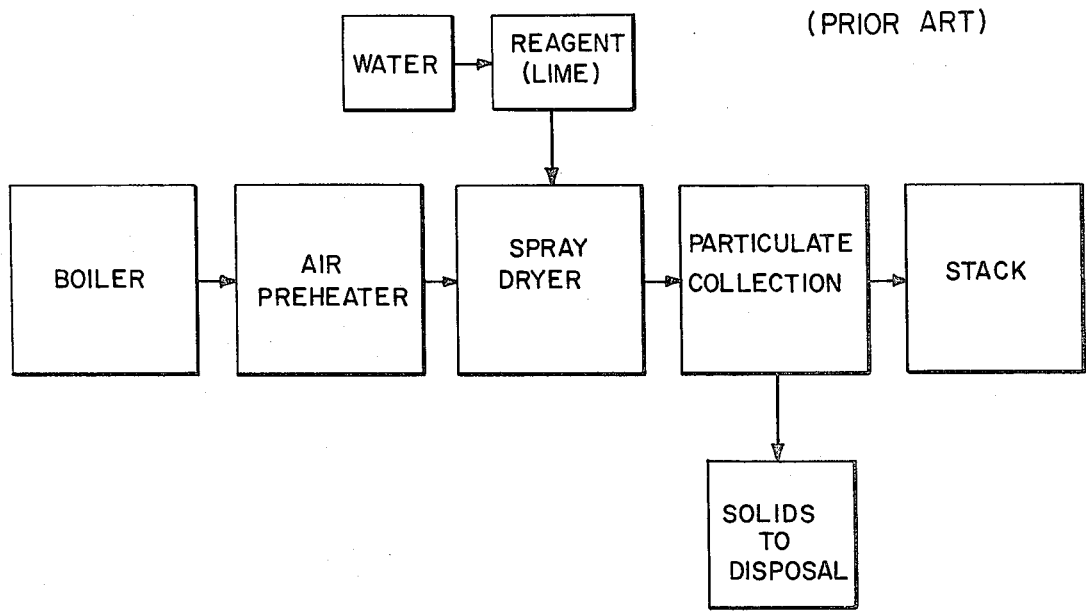
FIG. 1 shows the prior art spray drying process discussed above.

The effluent gases are conveyed from the boiler to the air preheater as is conventional in the art. The air preheater is, of course, used to transfer heat from the effluent gases into air which is on its way to the boiler. From the air preheater the effluent gases are conveyed into the spray dryer as is conventional in the art. The spray drying process which occurs at about 175° C. is conventional except that the amount of reagent such as lime, limestone, sodium compounds, magnesium compounds or mixtures thereof, may be less than would be used in the prior art spray drying process of FIG. 1, especially if the effluent gases are from high sulfur (2% or higher) content coal. As the lime or similar reagent is injected into the spray dryer as part of a slurry mixture with water, the water will evaporate from the heat of the effluent gases, thereby cooling the gases and increasing the moisture content. The stoichiometric ratio of reagent to sulfur oxides is preferably between 1:1 and 1.7:1. A range of 0.7 to 2.0 moles of lime per mole of $SO_2$ should be used. The amount of water should be 0.2 to 0.3 gpm per 1000 acfm. Some of the calcium from the lime will react with the sulfur dioxide as is conventional in the prior art process of FIG. 1. However, unlike the prior art process of FIG. 1, the reaction product and the unreacted calcium compounds continue into an electron beam irradiation chamber or reactor.

As shown in FIG. 3, the gas entering the electron beam reactor is at 60° C. Preferably this temperature should be at least below 100° C., the highly preferred value being between 60° C. and 70° C. Considering that the gas which entered the spray dryer was at approximately 175° C., it will be apparent that the spray dryer has substantially cooled off the gas. At the same time, the evaporation of the water in the spray dryer has of course increased the moisture content of the effluent gas which is provided to the electron beam reactor. Inasmuch as the electron beam reactor will remove pollutants more efficiently at lower temperatures and higher moisture levels, it will be readily appreciated that the spray drying process has not only removed a substantial quantity of the sulfur oxides but has additionally conditioned the effluent gas to render it more suitable for electron beam treatment. Accordingly, dosages such as between 0.5 and 2.0 megarads may be used for the electron beam treatment as opposed to the higher prior art values of 2.0–8.0 megarads. The electron energy should be about 0.5 MeV. The synergistic interplay between the spray drying process and electron beam process of the present invention is further evidenced by the fact that the unreacted calcium compounds or similar reagent will react with the acid mist formed within the electron beam reactor. That is, that portion of injected reagent which failed to react with the pollutants within the spray dryer will react with the acid mist formed within the electron beam reactor, thereby greatly optimizing the efficiency of the use of the reagent. Additionally, this reaction of the calcium compounds in-situ within the electron beam irradiation chamber will tend to keep the electron beam chamber dry and avoid corrosion caused by the acid mist which the irradiation causes. Furthermore, this reaction within the irradiation chamber helps to avoid the necessity of further processing of the products coming out of the electron beam reactor. That is, unlike the prior art which requires further processing of the acid mist formed within the electron beam reactor, the present invention reacts the acid mist at substantially the same time as the radiation.

As shown in FIG. 3, the reagent is injected only into the effluent gas within the spray dryer. The electron beam reactor irradiation chamber receives effluent gas directly (i.e., without intervening steps or additives) from the spray dryer as clearly shown in FIG. 3.

From the electron beam reactor the effluent gases are conveyed to a particulate collection means such as a fabric filter or electrostatic precipitator. As is shown in the drawing, the reaction within the electron beam reactor will heat the effluent gases by about 15° C., the exiting gas being at 75° C. The solids removed from the particulate collection means are a mixture of fly ash, calcium sulfate, calcium sulfite, calcium carbonate, and calcium nitrate. This mixture is a dry stable product which may be readily disposed of without further chemical reactions. The purified effluent gases are conveyed to the stack.

It will thus be appreciated that the present invention uses a spray drying process in synergistic combination with an electron beam process such that numerous of the disadvantages of either system may be avoided. Specifically, the spray drying process is made applicable to high sulfur content coals without requiring an excessive amount of reagent. The reagent is utilized more efficiently in the present invention in that reagent which fails to react within the spray dryer may be used within the electron beam reactor, thereby minimizing or avoiding the disadvantages of corrosion due to acid mist and further processing of the acid mist which electron beam processes have been previously subject to. Furthermore, the spray dryer lowers the temperature and increases the moisture content of the affluent gases, thereby conditioning them for more efficient electron beam treatment with lower power requirements. The present invention is especially advantageous in facilitating the retrofitting of the prior art spray drying process to include high sulfur capability.

Figure 2:
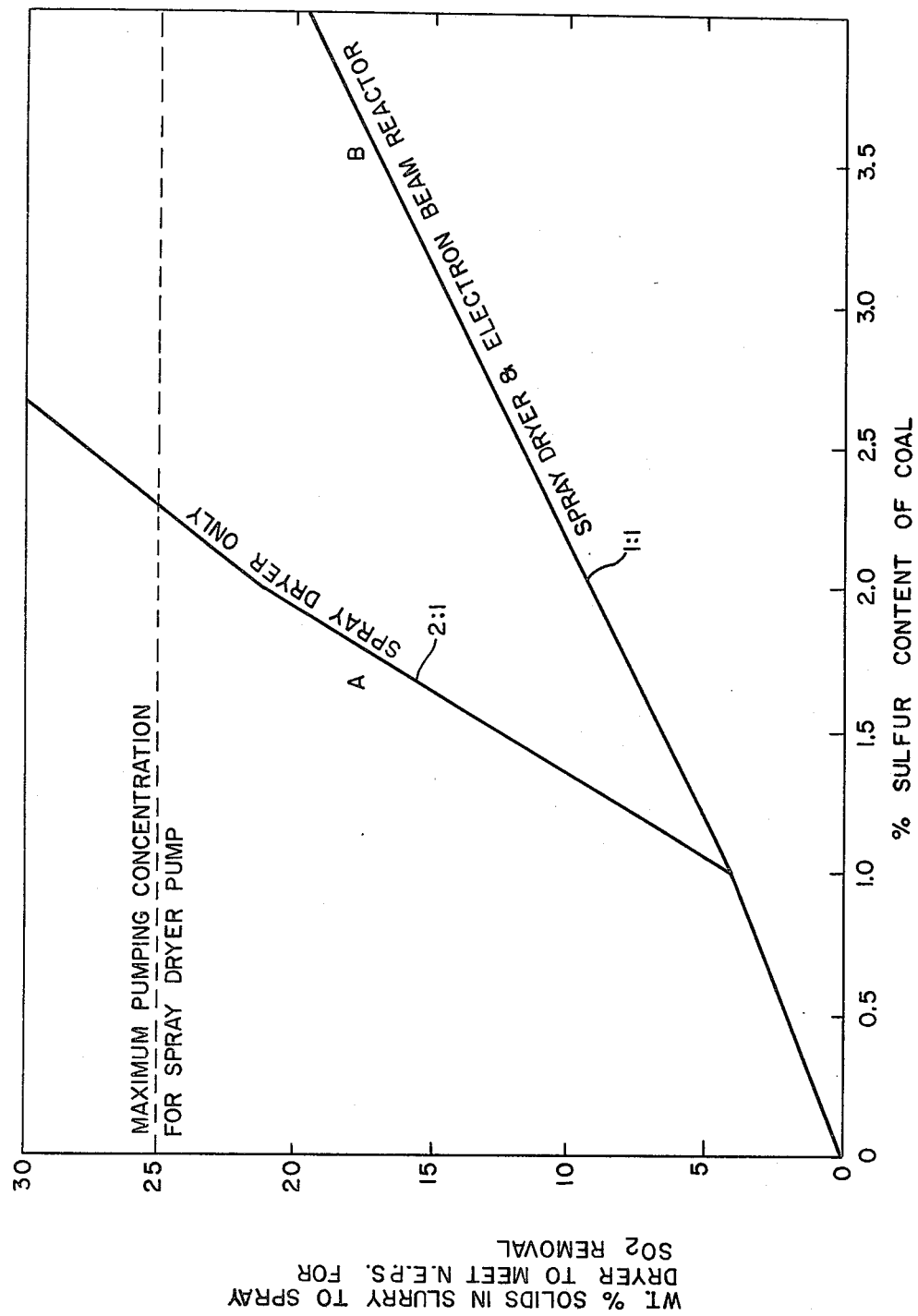
FIG. 2 is a graph useful for emphasizing the differences between the prior art and the present invention.

As shown in curve B of FIG. 2, the present invention is applicable to high sulfur content coals, instead of being limited to the low sulfur coals as the prior art spray drying process of curve A is. As shown in that figure, the present invention may use a stoichiometric ratio of 1:1 of calcium compounds to sulfur oxides to meet the recent EPA standards without exceeding the maximum pumping concentration.

Although the present invention has been described with reference to specific embodiments and methods, the specifics are for illustrative purposes only. Various modifications, adaptations and changes will readily occur to those of skill in the art. Accordingly, the scope of the present invention should be determined by reference to the claims appended hereto.

I claim:

1. A process for removing pollutants including at least sulfur oxides and/or nitrogen oxides from effluent gas, the steps comprising;
   (a) delivering the effluent gas into a spray dryer,
   (b) injecting liquid and a reagent into the effluent gas in the spray dryer, thereby decreasing its temperature, and increasing its moisture content, and the reagent reacting with sulfur oxides in the effluent gas to form a reaction product, said reagent being injected only into effluent gas in the spray dryer;
   (c) conveying the decreased temperature, increased moisture content, effluent gas including the reaction product and unreacted reagent into an irradiation chamber,
   (d) irradiating the decreased temperature, increased moisture content, effluent gas in the irradiation chamber, thereby converting gaseous sulfur oxides and/or nitrogen oxides into mist and/or solid particles,
   (e) subjecting the irradiated effluent gas to dry particulate collection, and wherein said reagent is a member of the group consisting essentially of:
   lime,
   limestone,
   sodium compounds,
   magnesium compounds,
   or mixtures thereof.

2. The process of claim 1 wherein, within the irradiation chamber, the unreacted reagent from the spray dryer reacts with mist caused by the irradiation.

3. The process of claim 1 or 2 wherein the effluent gas is combustion gas from 2% or higher sulfur content coal.

4. The process of claim 1 or 2 wherein the decreased temperature, increased moisture content, effluent gas is irradiated by an electron beam, the electron beam applying power of between 0.5 and 2.0 megarads.

5. The process of claim 1 or 2 wherein the stoichiometric ratio of reagent to sulfur oxides is between 1:1 and 1.7:1.

6. The process of claim 5 wherein the effluent gas is combustion gas from 2% of higher sulfur content coal.

7. The process of claim 1 or 2 where in the injecting of liquid and reagent into the effluent gas in the spray dryer lowers the temperature of the effluent gas to below 100° C.

8. The process of claim 7 wherein the injecting of liquid and reagent into the effuent gas in the spray dryer lowers the temperature of the effluent gas to between 60° C. and 70° C.

9. The process of claim 7 wherein the decreased temperature, increased moisture content, effluent gas is irradiated by an electron beam, the electron beam applying power is between 0.5 and 2.0 megarads and wherein the reagent reacts with sulfur oxides from the effluent gas.

10. The process of claim 7 wherein the effluent gas is combustion gas from 2% or higher sulfur content coal and wherein the stoichiometric ratio of reagent to sulfur oxides is between 1:1 and 1.7:1.

11. The process of claim 7 wherein the decreased temperature increased moisture content, effluent has is irradiated by an electron beam, the electron beam applying power of between 0.5 and 2.0 megarads, the stoichiometric ratio of reagent to sulfur oxides is between 1:1 and 1.7:1, wherein the effluent gas is combustion gas from 2% of higher sulfur content coal, and the scrubbing reagent reacts with sulfur oxides in the effluent gas.

* * * * *